(No Model.) 2 Sheets—Sheet 2.

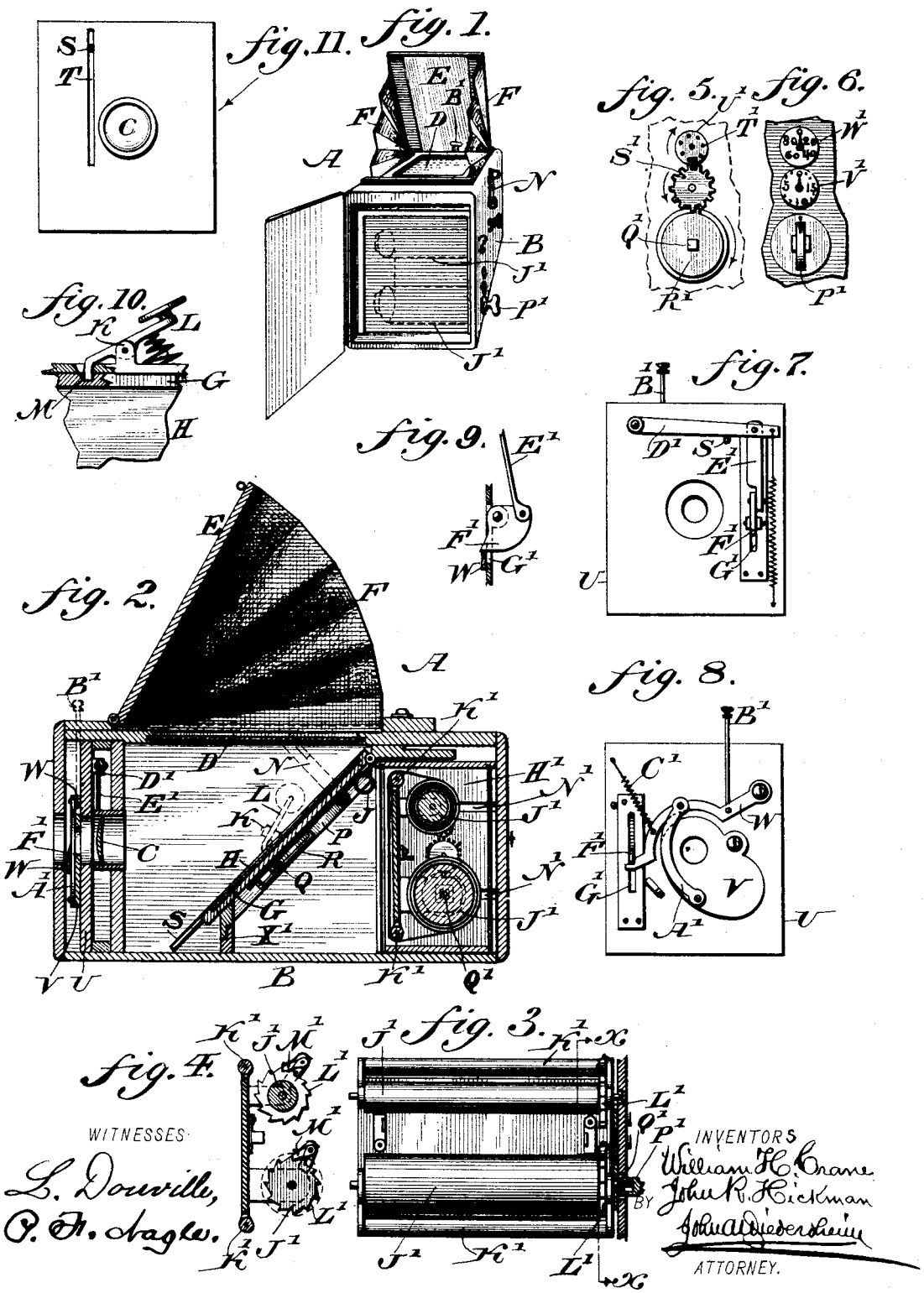

W. H. CRANE & J. R. HICKMAN.
ROLL HOLDING CAMERA.

No. 541,423. Patented June 18, 1895.

Witnesses
L. Douville,
P. F. Eagle.

Inventors
William H. Crane
John R. Hickman
By their Attorney
John A. Wiederheim

UNITED STATES PATENT OFFICE.

WILLIAM H. CRANE AND JOHN R. HICKMAN, OF PHILADELPHIA, PENNSYLVANIA; SAID HICKMAN ASSIGNOR TO SAID CRANE; SAID CRANE ASSIGNOR OF TWO-THIRDS TO GEORGE A. SCHRADIN, OF SAME PLACE, AND JOSEPH D. GREEN, OF WOODBURY, NEW JERSEY.

ROLL-HOLDING CAMERA.

SPECIFICATION forming part of Letters Patent No. 541,423, dated June 18, 1895.

Application filed March 21, 1894. Serial No. 504,493. (No model.)

*To all whom it may concern:*

Be it known that we, WILLIAM H. CRANE and JOHN R. HICKMAN, citizens of the United States, residing in the city and county of Philadelphia, State of Pennsylvania, have invented a new and useful Improvement in Roll-Holding Cameras, which improvement is fully set forth in the following specification and accompanying drawings.

Our invention consists of a camera formed with a swinging reflecting shutter, which when closed, throws on a ground glass, an exact copy of the object to be photographed, as it will appear on the negative.

It also consists of an auxiliary shutter, with mechanism whereby the same will be operated with relation to the swinging shutter.

It further consists of rolls for holding the films, said rolls being provided with teeth and ratchets, whereby improper rotation of the same is prevented.

Figure 12:
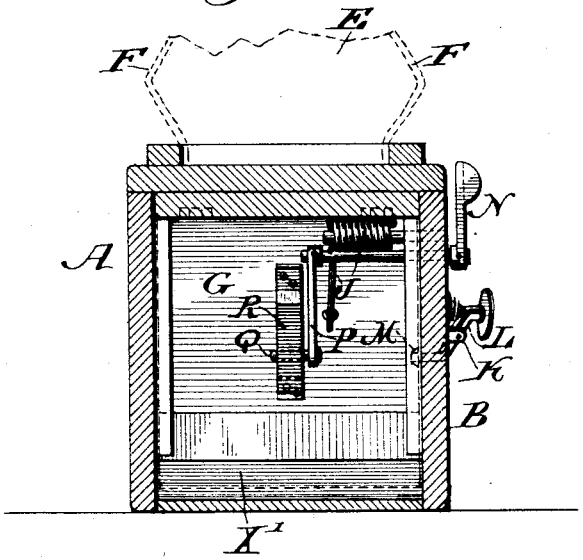
Figure 13:
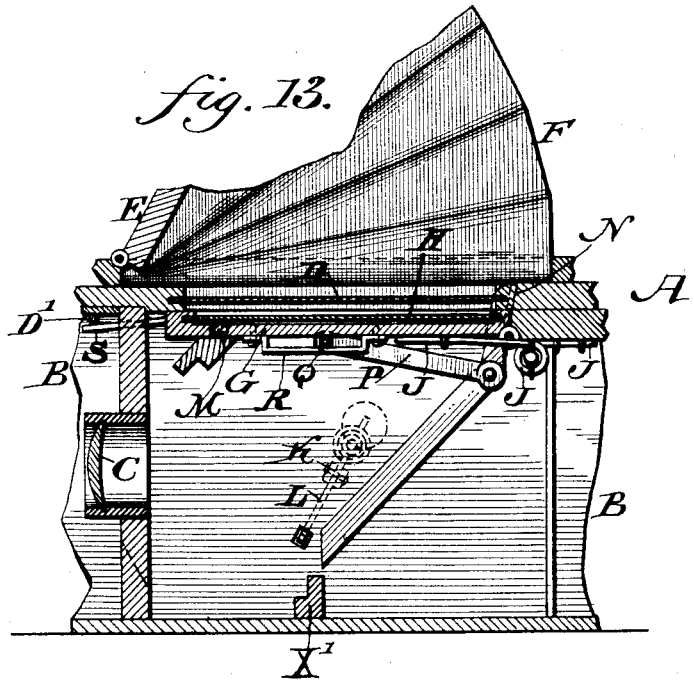

Figure 1 represents a perspective view of a camera embodying our invention. Fig. 2 represents a central vertical section thereof on an enlarged scale. Fig. 3 represents an elevation of the film-rolls on an enlarged scale. Fig. 4 represents a vertical section on line $xx$, Fig. 4, on an enlarged scale. Figs. 5 and 6 represent elevations of the film-holder operating and marking devices on an enlarged scale. Fig. 7 represents a rear elevation of mechanism for operating the auxiliary shutter on an enlarged scale. Fig. 8 represents a front elevation of the auxiliary shutter and mechanism for operating the same on an enlarged scale. Fig. 9 represents a side view of a detailed part of the camera on an enlarged scale. Fig. 10 represents a partly sectional and partly plan view of a catch employed in our device on an enlarged scale. Fig. 11 represents an elevation of a partition with a slot therein on an enlarged scale. Fig. 12 represents a vertical section of the device on line $xx$, Fig. 2, on an enlarged scale. Fig. 13 represents a central vertical section of the camera on an enlarged scale and showing the swinging shutter in elevated position.

Similar letters of reference indicate corresponding parts in the several figures.

Referring to the drawings: A designates a camera formed of a box B, carrying a lens C, and having a ground glass D in the top, said glass being of the same size as the negative. Secured to the top of the box B, and in front of the glass D, is a door E, to which one side of each of the bellows-like folds F is attached, the other sides thereof being fastened to the top of the box B, so that when the door is raised the folds extend, and when closed the parts form a light-tight joint.

G designates a swinging shutter on the interior of the box B, which is journaled in the sides thereof, beneath the ground glass, and which has a reflector H on the upper side, said reflector being adapted to throw the light, which enters through the lens C, upon the ground glass D, so that the object to be photographed will appear on said glass as it will on the negative. Secured to a suitable part of the box B, and to the under side of the shutter G is a spring J, which tends to elevate said shutter.

Pivoted in ears K on the side of the box B is a spring-actuated dog L, which is adapted to pass through the box into a socket M in the shutter, when the latter is lowered so that it is held in place.

N designates a lever on the exterior of the box B, which is secured to an elbow lever P, on the interior of said box, said elbow lever P having a pin Q, which moves in a guide R, attached to the bottom of the shutter G, and whereby said shutter may be elevated.

On the end of the shutter G, is a finger S, which moves in a slot T in a partition of the box B, when the shutter is elevated, as will be hereinafter described. In a lowered position the shutter G rests on the wall X'

U designates a shutter front board in front of the lens C, with an opening for the passage of the light, and to one side of which is pivoted a shutter V. Above the shutter is an arm W, which is connected therewith by the bar A', said arm W being secured to a rod B', which extends to the outside of the box B. A spring C' is attached to the holder U, and to the arm W.

On the opposite side of the front board U is attached the spring-actuated arm D', which has a rod E' secured thereto, on which rod is a catch F', the latter passing through a slot G' in the front board U, and being adapted to engage with the arm W, and prevent the upward movement thereof until disengaged.

H' designates a chamber on the interior of the box B, which may be removed therefrom. Mounted in said chamber are the rolls J' and J², the former being the supply roll and the latter the take up roll for the films which pass around the rollers K', said rolls J' and J² being provided with teeth L' and detents M' so that improper rotation is prevented.

The walls of the grooves N' in the sides of the chamber H, serve as supports for the bearings of the rolls J' and J², and any suitable means may be employed for retaining them in place, such means forming per se no part of our invention.

A key P' on the exterior of the box B passes through the wall thereof, and engages with the axis Q' of the lower roll J', whereby the latter may be turned, and thus a new section of the film is presented for exposure. On the axis Q' is a disk R', which has one tooth, and which engages with a gear S', the latter also having one tooth which is longer than the others, and adapted to engage with pins T' on the disk U'.

Indicators V' and W' on the exterior of the box are respectively secured to the gears S' and disk U', one counting from one to twenty, and the other counting by twenties from twenty to one hundred.

The operation is as follows: To set the camera, the rod B' is depressed, which forces down the shutter V and the arm W, the latter is engaged by the catch F' and the shutter V is held. The shutter G is turned down, and the dog L enters the socket M, and the shutter G is locked. The rays of light entering through the lens C strike the reflector H and are thrown upon the ground glass, where the object will be shown as it will appear on the negative. When the correct composition is obtained, the door E is lowered and fastened and the dog L is operated. This releases the swinging shutter G, which rises, owing to the action of the spring J. As it rises, the finger S on the shutter enters the slot T, and strikes the arm D' and elevates the same, which unlocks the catch F' from the arm W, the latter rising and with it the shutter V, the lens is closed and the picture is taken, it being noticed that the shutter V is not operated until the shutter G is out of line of the lens. The key is now turned, and the section of film used is wound on the lower roll J', and a new section of film is in position for another exposure. The swinging shutter G is turned down, and the dog L again engages the same. The rod B' is depressed and the catch F' engages the arm W, and the camera is ready for the next operation.

If it is desired to make a slow exposure, the lever R is used, whereby the shutter G may be raised and held at the required height, without operating the parts, and when released the same action will occur as before.

Having thus described our invention, what we claim as new, and desire to secure by Letters Patent, is—

1. In a photographic camera, a box with a lens, a pivoted shutter in said box with a reflector on its upper side, mechanism for elevating said shutter and separate mechanism for depressing it, said latter mechanism being operated from without said box, a finger on the lower end of said shutter, a shutter for said lens having a front board with a slot therein, said finger moving in said slot and operating actuating mechanism on said front board, for said lens shutter, said parts being combined substantially as described.

2. In a photographic camera, a box having a lens, a swinging shutter in said box, having a spring for elevating it, and mechanism for depressing it, a shutter for said lens, a pivoted arm connected by a bar to said lens shutter, an operating rod connected with said arm, a spring-controlled arm with a connected rod having a catch engaging said pivoted arm, and a finger on said swinging shutter engaging said spring-controlled arm, said parts being combined substantially as described.

3. In a photographic camera, a box having a lens, a swinging shutter in said box, means substantially as described for raising and lowering said shutter, a locking catch for said shutter, a finger on said shutter adapted to move in a slotted partition aside and above said lens, a shutter for said lens, and mechanism connected with said lens shutter and operated by contact with said finger on said swinging shutter, said parts being combined substantially as described.

4. In a photographic camera, a box having a lens, a swinging shutter in said box having a spring for raising it and means substantially as described for lowering it, a pivoted shutter for the lens, a shutter front board with an arm having a bar connected to said lens shutter, a spring-controlled arm with a rod having a catch working in a slot in said front board, and a finger connected with the swinging shutter and engaging said spring-controlled arm, said parts being combined substantially as described.

WILLIAM H. CRANE.
JOHN R. HICKMAN.

Witnesses:
 JOHN A. WIEDERSHEIM,
 WM. C. WIEDERSHEIM.